United States Patent [19]

Zukowski et al.

[11] Patent Number: 4,818,162
[45] Date of Patent: Apr. 4, 1989

[54] TIE-DOWN DEVICE FOR TRUCKS

[75] Inventors: Raymond C. Zukowski; Terrance M. Zukowski, both of Grand Rapids, Mich.

[73] Assignee: Zukowski Enterprises, Grand Rapids, Mich.

[21] Appl. No.: 83,444

[22] Filed: Aug. 10, 1987

[51] Int. Cl.⁴ .............................................. B61D 45/00
[52] U.S. Cl. ..................................... 410/116; 410/106
[58] Field of Search .................... 280/186; 294/82 R; 410/106, 96, 97, 101, 104, 116

[56] References Cited

U.S. PATENT DOCUMENTS

| | | |
|---|---|---|
| 69,434 | 10/1867 | Hicks . |
| 118,791 | 9/1871 | Calvert . |
| 1,938,158 | 12/1933 | Steele ................................. 294/92 |
| 2,000,306 | 5/1935 | Tobin ................................ 105/368 |
| 2,626,176 | 1/1953 | Braun ................................ 294/82 |
| 2,655,874 | 10/1953 | Swann .............................. 105/369 |
| 2,675,265 | 4/1954 | Meighan et al. ................ 105/369 |
| 2,680,644 | 6/1954 | Marconi ............................ 294/82 |
| 2,685,848 | 8/1954 | Meighan et al. ................ 105/369 |
| 2,685,849 | 8/1954 | Meighan et al. ................ 105/369 |
| 2,866,248 | 12/1958 | Reno ................................... 24/248 |
| 2,870,722 | 1/1959 | Oakley ............................. 105/369 |
| 3,248,144 | 4/1966 | Hinds ................................. 294/16 |
| 3,580,187 | 5/1971 | Marks .............................. 105/369 |
| 3,797,859 | 3/1974 | Vasquez ........................... 280/179 |

FOREIGN PATENT DOCUMENTS 534933 3/1954 Belgium .

*Primary Examiner*—Henry A. Bennet
*Attorney, Agent, or Firm*—Price, Heneveld, Cooper, DeWitt & Litton

[57] ABSTRACT

A tie-down device for securing an object to a cargo bed comprising a substantially channel-shaped structure which removably mounts along a side of the bed and is infinitely adjustable therealong. The device includes a lower hook which wraps around the bottom surface of the bed adjacent the side, an engagement structure which engages the top portion of the bed to facilitate retention of the device on the bed, and a coupling which receives and engages a chain or the like to facilitate holding the object on the bed.

23 Claims, 3 Drawing Sheets

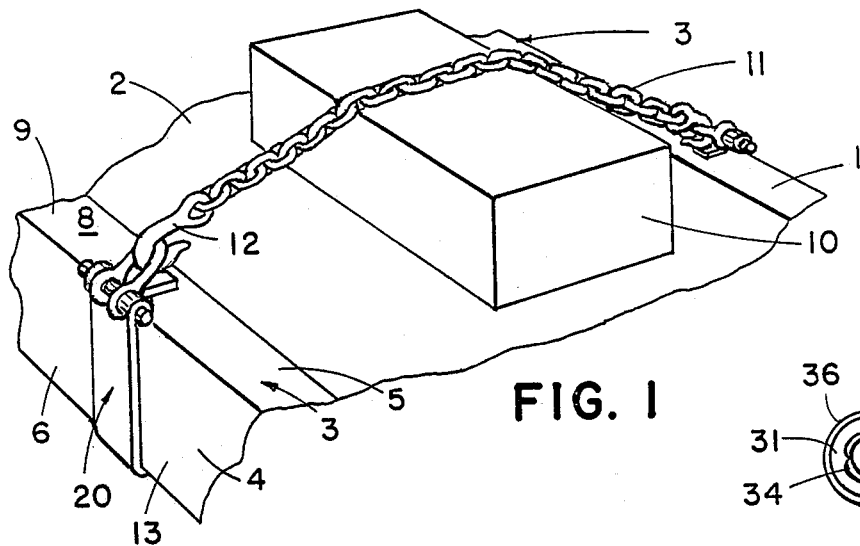
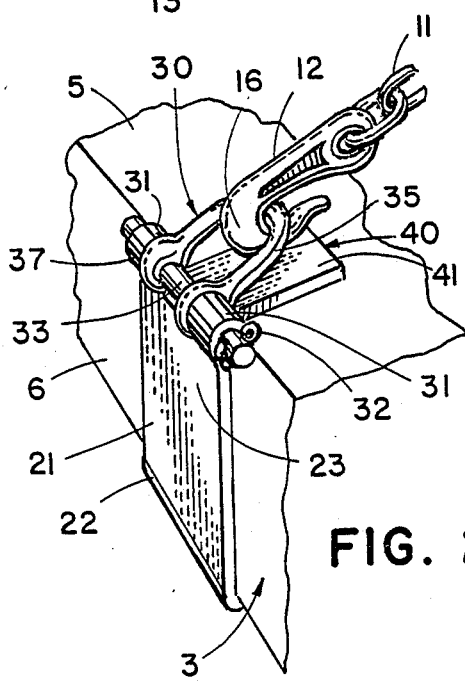
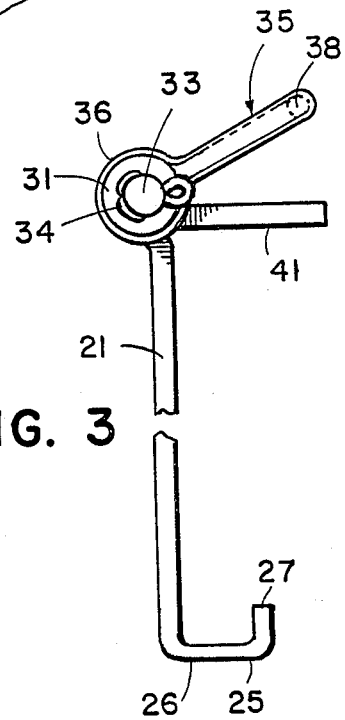
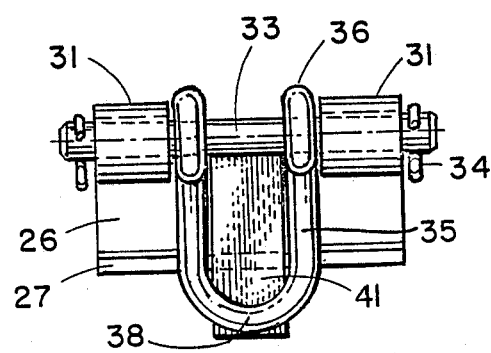
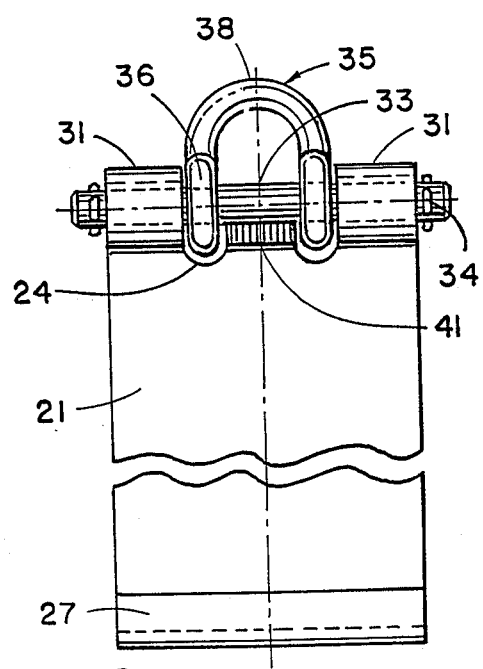

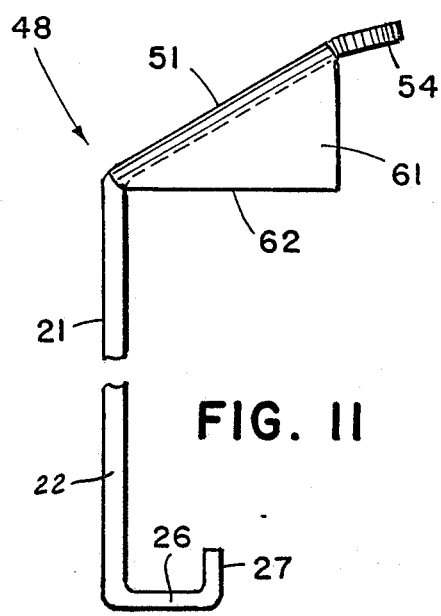
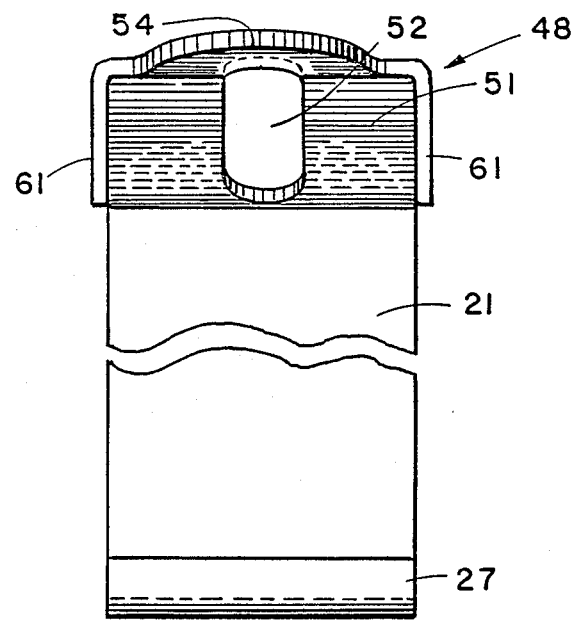
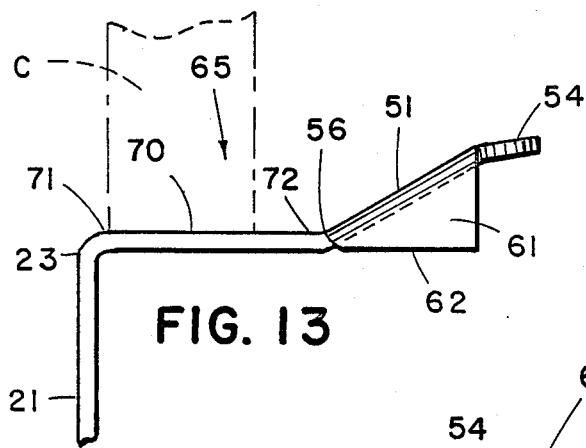
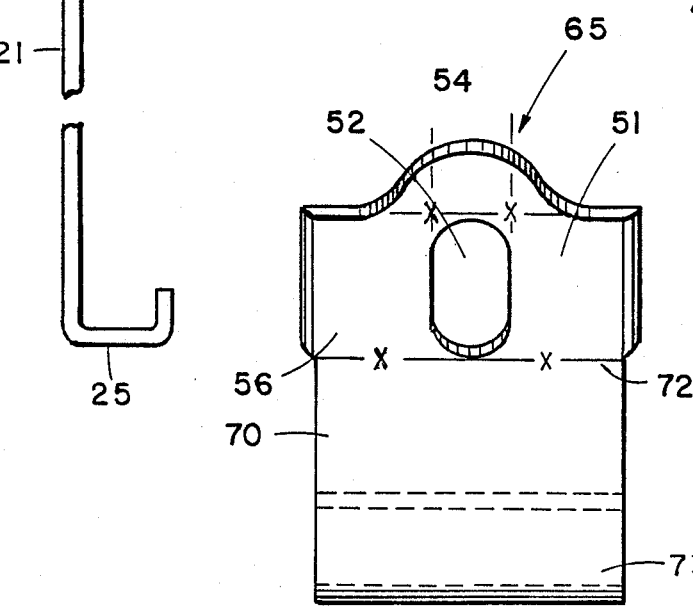
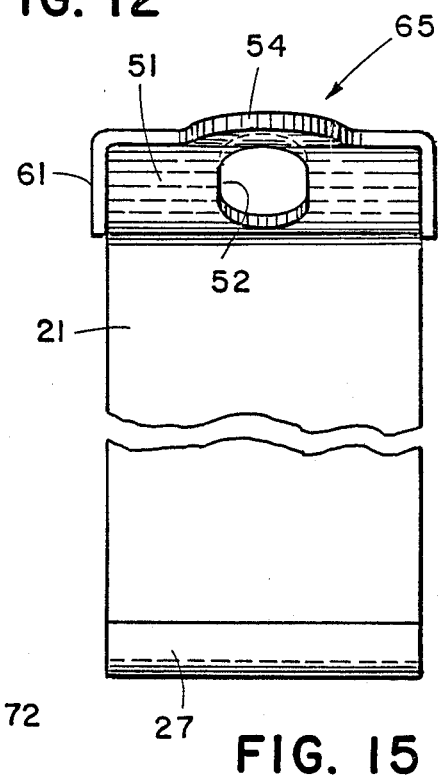
FIG. 11
FIG. 12
FIG. 13
FIG. 14
FIG. 15

TIE-DOWN DEVICE FOR TRUCKS

BACKGROUND OF THE INVENTION

The present invention pertains to anchoring devices for securing an object to a cargo bed, such as for a flatbed truck, railroad flatcar or the like.

Flatbed trucks are exemplary of common hauling equipment used across a wide range of businesses. A flatbed truck typically comprises a relatively large, planar mounting or support surface, usually without surrounding sidewalls. Large or bulky items may be easily placed and supported thereon for transport. The bed is primarily comprised of wood, but usually also includes a pair of channel-shaped metal rails attached to opposing sides thereof. The rails are designed to perform a two-fold function including increasing the overall strength of the bed and providing a more durable material to which devices for securing objects on the bed may be attached.

The transportation or hauling of large and bulky objects in particular often engender special difficulties since conventional packing and shipping means are inappropriate. Flatbed trucks have been used extensively for the hauling of such items, due to their capacity of holding a wide range of objects of different shapes and sizes. However, the unencumbered mounting surfaces which make these trucks attractive require special anchoring devices to prevent the object from shifting or falling from the bed. Chains provided with end hooks are normally employed to hold the item in place, although cables or other retaining means may be utilized.

More specifically, the anchoring chains overlie the object to be held in a tight frictional engagement, and are fastened to opposing sides of the trunk bed. Yet, the manner by which the chains are coupled to be bed has been a persistent problem. Typically, square holes have been provided in the siderails of the bed along with corresponding posts that are received therein. The anchoring chains may then be fastened directly to the posts to complete the mounting of the object on the bed.

This arrangement, however, has several disadvantages. First, the holes are generally provided at only a few locations along the side of the bed, which drastically limits the user's options in securing objects on the bed. For instance, a particularly bulky item may, because of the placement of the holes and posts, need to be mounted in the center of the truck thereby precluding the mounting of other items, and in turn, requiring additional trucks. Hence, the efficiency of the flatbed truck may be severaly reduced because of restricted anchoring options. Similarly, the provision of an upright post may occasionally be in the way of a portion of the bulky item to be held or not as advantageously located as the use may need.

Secondly, the square holes concentrate the force at the top surface of the rails which thereby tends to distort and damage the bed.

Thirdly, it is sometimes desirous to provide the flatbed truck with a rigid cover means in an effort to protect the object being hauled from dust and debris or inclement weather. These covers are generally mounted to the rails of the flatbed truck. However, when using the post and chain mounting arrangement it is not possible to employ such a cover.

Lastly, it is noted that many businesses rely on rented trucks for their hauling needs. While rented trucks generally are provided with chains, they typically have no means by which to attach the chains to the truck bed. Consequently, the user normally attached the chains directly to the openings in the truck bed. Again, this not only lacks the desired versatility needed to maximize the truck's efficiency, but also applied a concentrated force which tends to distort and damge the truck bed.

In an effort to solve these problems, prior artisans have developed several alternatives. One alternative has been to fixedly attach tie-down devices to the side of the bed through the use of bolts, rivets, welding, or the like. While this arrangement may distribute the load in a more effective manner, it still has many shortcomings. For example, since the devices are permanently attached to the side of the bed, it still lacks the adjustment versatility needed to maximize mounting efficiency. Also, these arrangements alter the side of the truck in a permanent fashion, and hence are not possible when using rented trucks. Further, these devices have not accommodated the use of a cover means.

It has also been suggested to mount a tie-down device so that it is adjustable along the side of the bed. Such devices do offer a better distribution of the load and, since they are adjustable, they do facilitate mounting efficiency. However, the flatbed trucks employing these devices have been specifically adapted with means to accommodate such a movable device. Furthermore, these devices have been permanently mounted on the flatbed trucks, thereby precluding, for instance, easy removal and positioning of the device on a different side of the flatbed truck. While these devices may operate satisfactorily on such specially adapted vehicles, they provide no advantage to the thoudsands of flatbed trucks already in use without special modifications. Also, the manufacture of flatbed trucks that are specially adapted for the adjustable devices is a more expensive endeavor than the manufacture of a conventional flatbed truck. Moreover, these deivces do not facilitate the use of a rigid cover means.

A third arrangement of tie-down devices that have been suggested are removably mounted and adjustable along the side of a truck bed. However, these devices are normally articulated in such a way so as to clampingly grip the side of the bed when a load is applied through the chain. Hence, these devices are awkward to use, since they require that the chain be immediately fastened thereto in order to be retained on the side of the bed. These devices also do not accommodate the use of a rigid cover means.

Hence, these is a great need for a tie-down device which effectively distributes the load acrosss a portion of the rail to eliminate bending an distortion of the bed, is removably mounted to the side of the bed, and is readily adjustable to an infinite number of locations along the side of the bed. Also, a tie-down device which facilitates the use of a rigid cover would also be highly desirous to many users.

SUMMARY OF THE INVENTION

In the present invention, securing means (such as chains) are fastened to a cargo bed via tie-down devices which are removably and adjustably mounted onto the side of the bed. Preferably, the tie-down device comprises a generally channel-shape structure having a body which extends along the side of the bed between the top and bottom surfaces thereof. A hook means projects from the lower end of the body, and extends around the bottom edge of the siderail of the truck bed to counteract forces generated by the chains. An upper engagement means extends from an opposite end of the body and across the top surface of the bed, so that the device may be retained on the bed solely by its own configuration. Lastly, a coupling means is also attached to the upper end of the body to facilitate attachment of the chains to the device.

In the more preferred embodiments, various alternative coupling means are provided for accommodating the attachement of the securing means. Two of the embodiments utilize a pivotally mounted clevis member which is able to align itself with the direction of force applied through the chain, and thereby reduce the stress generated in the device. The other two embodiments provide rigid tie-down devices which may be constructed solely from a single piece of sheet metal. One of these embodiments is further designed to accommodate the use of a rigid cover means.

The user, by employing this invention, may therefore eliminate unwanted distortion and bending damage to the truck bed without the need for special mounting adaptations or arrangements. The deivce may be easily mounted, positioned, and retained on the truck bed without the need for bolting, welding, or applying the load from the chain immediately thereto. Hence, the devices may be applied to existing trucks, and are particularly advantageous when using rented trucks, since they are easily mounted and removed without altering or damaging the truck bed in any way. Furthermore, once the device is mounted on the bed, it may be inifinitely adjusted therealong so that any variation in the mounting may be readily accomplished.

These and other objects, advantages and features of the present invention will be more fully understood and appreciated by reference to the written specifications and the appended drawings.

BRIEF DESCRIPTION OF THE DRAWINGS

FIG. 1 is a perspective view of an object mounted to a cargo bed by the use of a securing chain and the first embodiment of the present invention;

FIG. 2 is an enlarged perspective view of the first embodiment of the present invention mounted to the side of the bed and engaged with the end hook of the chain;

FIG. 3 is a side elevational view of the first embodiment of the present invention;

FIG. 4 is a top plan view of the first embodiments of the present invention;

FIG. 5 is a front elevational view of the first embodiment of the present invention;

FIG. 11 is a side elevational view of the third embodiment of the present invention;

FIG. 12 is a front elevational view of the third embodiment of the present invention;

FIG. 13 is a side elevational view of a fourth embodiment of the present invention;

FIG. 14 is a top plan view of fourth embodiment of the present invention; and

FIG. 15 is a front elevational view of the fourth embodiment of the present invention.

DETAILED DESCRIPTION OF THE PREFERRED EMBODIMENTS

Figure 6:
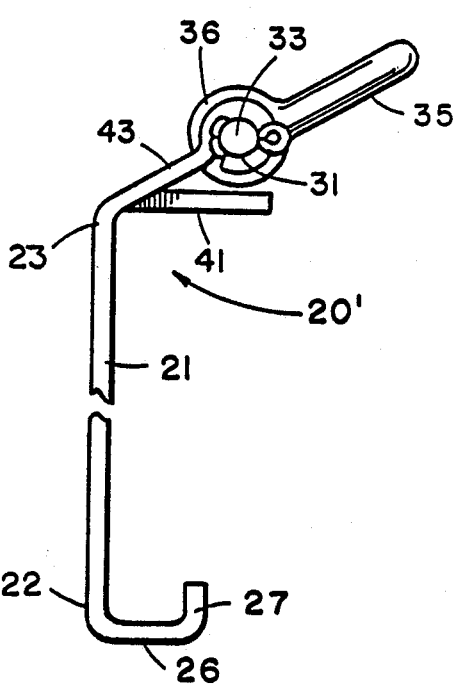
FIG. 6 is a side elevational view of a second embodiment of the present invention.

Referring now to the drawings in greater detail, the tie-down devices of the present invention such as tie-down device 20 are adapted for mounting on the side of a cargo bed 1 for a flatbed truck to secure an object 10 to the bed to be hauled from one location to another (FIG. 1). The various tie-down devices 20, 20', 48 and 65 of this invention each include: a coupling 30, 50 which facilitate engagement with securing chains 11, which in turn, tightly engage and hold object 10 to bed 1; a lower hook 25 which serves to hold devices 20, 20', 48 and 65 to bed 1 upon application of the force applied by chains 11; and an engagement apparatus or structure 40, 60 extending over truck bed 1 in engaging relation, to retain devices 20, 20', 48 and 65 thereto in the initial positioning of the device on bed 1. Various embodiments of the present invention are disclosed below and like parts in the different embodiments will be identified by the same reference numerals.

Figure 9:
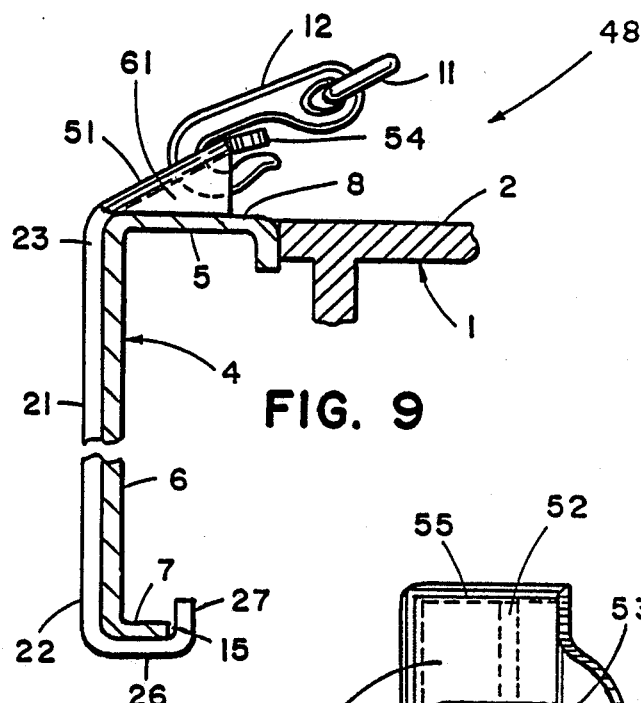
FIG. 9 is a fragmented cross-sectional view of a truck bed with the third embodiment of the present invention mounted on the side of the bed and engaging an end hook of a securing chain.
Figure 10:
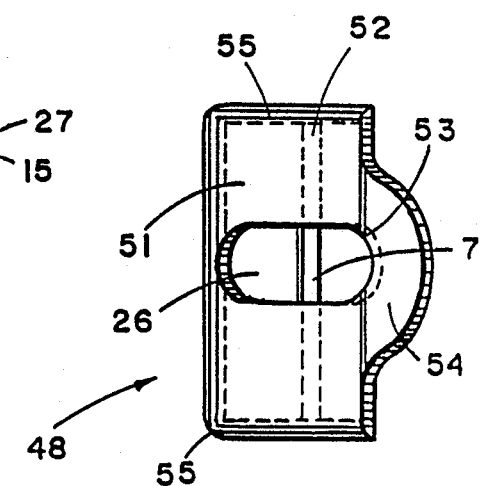
FIG. 10 is a top plan view of the third embodiment of the present invention.

Flatbed trucks generally comprise a long and broad top or planar mounting surface 2 usually made of wood upon which a large, heavy or bulky object 10 may be placed for hauling. Typically, bed 1 includes along each of its sides 3 a metal siderail 4 fixedly secured thereto by any well known means. Rails 4 provide extra strength for bed 1 and a durable securement to which chains 11 may be attached. Siderail 4 is substantially channel-shaped and provided with top flange 5, mid section 6 and lower flange 7 (FIG. 9). Top flange 5 includes top surface 8 which lies generally in the same plane as mounting surface 2 of bed 1, and hence, extends the width of bed 1. Extending downwardly at a right angle from outside edge 9 of top flange 5 is mid section 6, which forms the sidewall of bed 1. Attached along lower end 13 of mid section 6 is lower flange 7 which projects inwardly in an underlying and parallel relation to top flange 5. Lower flange 7 is mounted in a cantilevered fashion, and therefore is provided with a free end 15 (FIG. 9), which is generally a short distance from mid section 6.

Tie-down device 20 is also substantially channel-shaped and generally wraps around the external surfaces of siderail 4. While tie-down device 20 may be tightly fitted to rail 4, a certain amount of looseness is acceptable, and will even make the mounting of device 20 on rail 4 somewhat easier. Tie-down device 20 includes a body 21 which extends along and substantially parallel to rail mid section 6, and is provided with a first end 22 along its bottom edge and a second end 23 along its top edge. Projecting inwardly from first end 22 of body 21 is lower flange or hook 25 which is generally of an L-shaped configuration. Hook flange 25 includes a first leg 26 which is integral with and extends from body 21 and lies along lower flange 7 of rail 3 in a substantially parallel relationship. A second leg 27 extends upwardly at substantially a right angle to first leg 26, so that it is juxtaposed to free end 15 of lower flange 7. Consequently, the lower portion of tie-down device 20—which includes the lower portion of body 21, first leg 26, and second leg 27—defines a substantially U-shaped structure which wraps around lower flange 7 of rail 4.

As shown in FIGS. 2, 4 and 5, second end 23 of body 21 is provided with a pair of spaced cylindrical ears 31, each provided with a bore 32 whose longitudinal axis is substantially parallel to the longitudinal axis of bed 1. Bores 32 are aligned to receive therethrough a pivot pin 33. Pivot pin 33 is secured in ears 31 via the use of cotter pins 34, or by any other well known means. Coupling 30 comprises a clevis 35 which is pivotally mounted on pivot pin 33. Clevis 35 includes a bight portion 38 and two closed ends 36. Each end 36 is provided with a circular opening 37 shaped to matingly receive pivot pin 33 therethrough. Ends 36 are preferably mounted on pivot pin 33 between ears 31, but clearly may be mounted in any other well known manner. Notches 24 may be provided in body 21 in order to better facilitate the mounting of clevis 35. Clevis 35 is sized to engage and receive hook 12 therethrough in a conventional manner between bight 38 and pin 33. Due to clevis 35 being pivotally mounted, it may easily align with the direction of the tensile force generated along chain 11, to thereby reduce the amount of stress experienced in the tie-down device.

Tie-down device 20 further comprises engagement apparatus 40 which includes tang or flange 41 fixedly attached to second end 23 of body 21 and extending inwardly therefrom at substantially a right angle. Tang 41 is preferably centrally located between ears 31, and is adapted to extend along in engaging relation with top surface 8 of rail 4. Tang 41 enables device 20 to be retained on bed 1 during initial positioning, prior to the fastening of hook 12, and without the need for other fixing means (such as bolts, rivets, etc.). This arrangement advantageously permits the user to preliminarily set up the tie-down devices where needed along the bed without having to immediately attach the chain thereto or utilize a more permanent fixing means which would alter rail 4.

The present tie-down device may be constructed in an easy and inexpensive manner. For instance, much of the device may be formed from a single piece of sheet metal. More specifically, it is clearly seen that a single piece of sheet metal could be bent to form lower hook 25. In the upper portion of the piece of sheet metal, two parallel spaced apart kerfs could be cut therein to define three separate portions. The central portion may be bent downwardly to form tang 41, and the two remaining portions may be curled over to form ears 31 with bores 32 defined therein. Subsequently, pivot pin 33 and clevis 35 may be assembled to the formed piece of sheet metal. Of course, the device may be constructed in any other well known manner.

Figure 7:
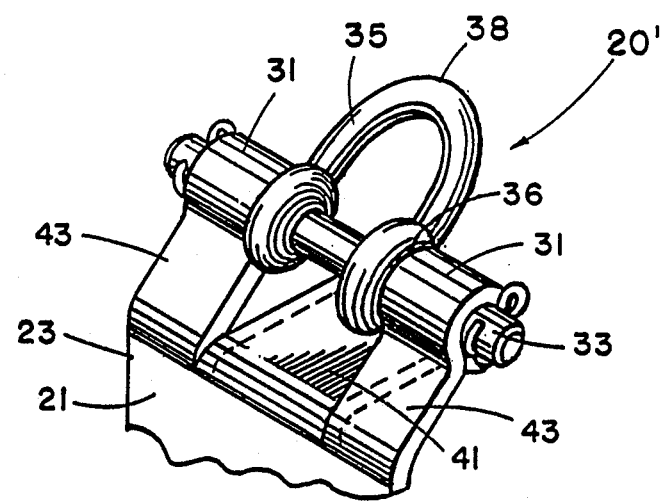
FIG. 7 is a fragmented, perspective view of the upper portion of the second embodiment of the present invention.
Figure 8:
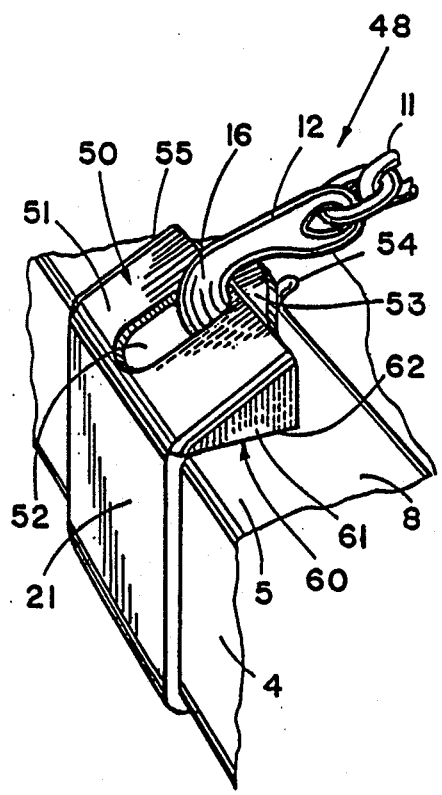
FIG. 8 is a perspective view of a third embodiment of the present invention mounted to the side of a cargo bed and engaged with the end hook of securing chain.

The second preferred embodiment 20' (FIGS. 6 and 7) is similar to embodiment 20 except for a modification in the mounting of clevis 35. In this embodiment, ears 31 are connected to second end 23 of body 21 via two spaced arms 43. Arms are integral with and extend from second end 23 of body 21 and are positioned on each side of tang 41. Further, arms 43 are inclined upwardly from body 21, such that they are at an acute angle relative to tang 41. In this arrangement, since clevis 35 is raised above tang 41, the user can always easily grasp and hook chain 11 to clevis 35. Note also, that embodiment 20' may be constructed in essentially the same fashion as embodiment 20, except for the addition of the two arms 43, which may also be formed from the one piece of sheet metal.

A third embodiment 48 of the tie-down device (FIGS. 8-12) is of a rigid, non-pivoting construction. Coupling 50 includes a plate number 51 which is integral with and extends from the second end 23 of body 21, and projects inwardly over top surface 8 of rail 4. Plate member 51 is inclined to project upwardly at an acute angle to top surface 8 in order to provide space for hook 12, as will be discussed below. An elongated opening 52 formed centrally of plate member 51 is provided to receive hook 12 therethrough. Hook 12 is secured such that bight 16 of the hook engages distal end 53 of opening 52. Plate member 51 is substantially rectangular in shape but is provided with an arcuate extension 54 projecting beyond opening 52. Extension 54 supplies additional strength to plate member 51 to thereby effectively counteract the force generated through hook 12. Extension 54 is preferably bent downward slightly relative to plate member 51. The forces generated by the attachement of chains 11 typically have a large downwardly directed component which is applied to extension 54. Hence, structing extension 54 with a lesser inclination than plate member 51 tends to reduce the amount of stress created therein.

Engagement apparatus 60 includes a pair of downwardly extending, triangular legs 61 which engage top surface 8 with their lower edges 62. One of the legs 61 is integral with and extends from each of the opposing side edges 55 of plate member 51 at a substantially right angle thereto. Legs 61 not only retain tie-down device 20 on rail 4 until the chain is attached, but also increase the structural integrity of plate member 51 by serving as braces therefor.

Embodiment 48 of the present invention may also be constructed in an easy and inexpensive manner. The entire tie-down device 48 may be constructed of a single piece of sheet metal. More specifically, the sheet metal is cut into its predetermined shape needed for forming. Secondly, elongated opening 52 may be cut into the upper portion of tie-down device 20. Lower hook 25 is formed in the same manner as discussed in regard to first embodiment 20. Coupling 40 and engagement apparatus 60 are then formed by first bending plate member 51 at its predetermined angle to body 21, and then, subsequently bending legs 61 downwardly from each opposing side 55 of plate member 51. Note, that while arcuate extension 54 may be cut or stamped into the original piece of sheet metal, it may also be welded thereon after the bending procedure is accomplished. Of course, the embodiment may be constructed in any other well known manner, such as by welding the different pieces togther.

A fourth embodiment 65 (FIGS. 13-15) is similar to third embodiment 48, in that it employs substantially the same coupling 50 and engagement apparatus 60 as does the third embodiment. Of course, as is illustrated in FIG. 13, the size of the engagement apparatus and the angle of inclination of plate member 51 and extension 54 may be varied. In fourth embodiment 65, plate member 51 is connected to body 21 via an intermediate extension member 70. More specifically, extension member 70 is provided with a first end 71 which is integral with and extends from second end 23 of body 21 such that extension member 70 projects inwardly therefrom at substantially a right angle. An opposite second end 72 of extension member 70 is fixedly connected to outer end 56 of plate member 50. In this way, coupling means 50 and extension means 60 are spaced inwardly from outside edge 9 of bed 1 a sufficient distance to allow the use of a rigid cover such as that shown at C in phantom in FIG. 13. Cover C may be of any well known construction that mounts to bed 1 in a conventional manner. More specifically, this arrangement positions coupling 50 and engagement apparatus 60 within the cover so that chain 11 may be secured thereto without interfering with the cover. While it is true that the cover will engage extension member 70, it is noted that member 70 is of a sufficiently thin construction that no significant interference with result.

Fourth embodiment 65 is constructed in a similar fashion to that disclosed for the third embodiment 48, with the exception that the piece of sheet metal will be longer and the extension member 70 will be included in the bending procedure. Also, as with third embodiment 48, this particular construction is not required, but is merely exemplary of one particular manner of manufacturing the device.

The use of the present tie-down devices facilitate the securing of object of bed 1 in a quick and easy manner. The devices mount readily to the side of the truck bed without the need for applying a load thereto, extra fastening means, or altering the truck bed in any way. Due to the engagement apparatus, the devices may be preliminarily placed on the bed in order to determine the most efficient securing arrangement. As such, devices 20 may be easily adjusted and repositioned as many times as necessary. Furthermore, the devices are adjustable to an infinite number of positions, rather than a few predetermined spaced locations, as is common in the prior art. Devices 20 also effectively distributes the load across a sufficient distance of rail 4 so that bed 1 experiences no distortion or bending damage. Further, in regard to the fourth embodiment 65 of the present invention, a tie-down device is provided which facilitates the use of a rigid cover that may be placed over the object to be hauled.

Of course, it is understood that the above are merely preferred embodiments of the invention, and that various other embodiments as well as many changes and alterations may be made without departing from the spirit and broader aspects of the invention.

The embodiments of the invention in which an exclusive property or privilege is claimed are defined as follows:

1. In a system for mounting an object to a cargo bed provided with a top mounting surface, oppostie side surfaces and bottom surfaces adjacent said sides, wherein the system includes a securing means which extends over the object in a tight-fitting manner and is coupled to opposite sides of the bed, the improvement comprising a substantially channel-shaped tie-down device for coupling said securing means to the bed, said tie-down device being removably mountable to a side of the bed and infinitely adjustable therealong, said tie-down device including:
   a body adapted to extend along said side of the bed and having a first end and an opposite second end;
   a hook means for grippingly engaging the bed to resist tensile forces generated in the securing means, said hook means being fixedly attached to said first end of said body and extending outwardly from said body in a first direction such that said hook means will wrap around said bottom surface of the bed adjacent the side of the bed;
   coupling means provided with an opening fro receiving and retaining the securing means to facilitate coupling of the securing means to the bed, said coupling menas being pivotally mounted to said second end of said body for movement about an axis substantially parallel to the top surface of said cargo bed, so that said coupling menas aligns itself with the direction of said tensile forces created in the securing means, whereby stress generated in said device by said tensile forces is reduced; and
   engagement means adjacent said coupling means and extending outwardly from said second end of said body for matingly engaging the top surface of the bed, said engagement means enabling said device to be mounted and retained on the bed solely by its own configuration.

2. The system of claim 1 in which said hook means includes a first leg and a second leg forming an L-shaped configuration wherein said first leg is fixedly attached to said first end of said body at substantially a right angle thereto in said first direction, and wherein said second leg is fixedly attached to an end of said first leg opposite said end attached to said body at substantially a right angle thereto and in a direction which is generally toward said engagement means, whereby said body, said first leg and said second leg collectively define a U-shaped configuration which is adapted to wrap around the bottom surface of the bed adjacent one of the sides of the bed.

3. The system of claim 2 in which said coupling means includes a plate member provided with a first end and a second end, in which said first end is fixedly connected to said second end of said body and wherein said plate member extends outwardly from said body at an angle to said first direction, whereby said plate member is adapted to extend over said top surface of said bed at an acute angle thereto, and wherein said plate member further includes a centrally located elongated opening adapted to receive and engage the securing means to thereby facilitate coupling of the securing means to the bed.

4. In a system for mounting an object to a cargo bed provided with a top mounting surface and opposite side surfaces and bottom surfaces adjacent said sides, wherein the system includes a securing means which extends over the object in a tight-fitting manner and is coupled to opposite sides of the bed, the improvement comprising a substantially channel-shaped tie-down device for coulping said securing means to the bed, said tie-down device being removably mounted to a side of the bed and infinitely adjustable therealong, said tie-down device including:
   a body adapted to extend along said side of the bed and having a first end and an opposite second end;
   a hook means for grippingly engaging the bed to resist tensile forces generated in the securing means, said hook means being fixedly attached and extending outwardly from said body in a first direction such that this hook means will wrap around said bottom surface of the bed adjacent the side of the bed;
   coupling means for receiving and retaining the securing means, said coupling means including a plate member having a first end and a second end, said first end being fixedly connected to said second end of said body and said plate member extending outwardly from said body at an angle to said first direction, whereby said plate member is adapted to extend over said top surface of said bed at an acute angle thereto, said plate member further including an opening adapted to receive and engage the securing means to thereby facilitate coupling of the securing means to the bed; and engagement means adjacent said coupling means and extending outwardly from said second end of said body for matingly engaging the top surface of the bed, said engagement means enabling said device to be mounted and retained on the bed solely by its own configuration.

5. The system of claim 4 wherein said structure further comprises an extension member which fixedly connects said plate member to said second end of said body, wherein said extension member extends outwardly from said body at a substantially right angle thereto, and is adapted to matingly engage with said top surface of the bed.

6. The system of claim 5 in which said engagement means includes a pair of spaced apart legs which extend in said first direction relative to said body and extend toward said hook means relative to said body and extend toward said legs are each provided with a first end and a second end in which said first end is fixedly mounted to said plate member and said second end is adapted to engage the top surface of the bed.

7. The system of claim 4 in which said engagement means includes a pair of spaced apart legs which extend in said first direction relative to said body and extend toward said hook means relative to said plate member, and wherein said legs are each provided with a first end and a second end in which said first end is fixedly mounted to said plate member and said second end is adapted to engage the top surface of the bed.

8. A tie-down device for use in securing an object to a cargo bed of the type having a top mounting surface, opposite side surfaces, and bottom surfaces adjacent said sides, wherein said device couples to the bed a securing means which is adapted to engage and hold said object, and wherein said device is substantially channel-shaped and removably mounts to a side of the bed and is infinitely adjustable therealong, said device comprising:

a body which is adapted to extend along said side of the bed, and is provided with a first end and an opposite second end;

a hook which is fixedly attached to and extended outwardly from said first end of said body in a first direction so that said hook is adapted to wrap around said bottom surface adjacent said side, whereby said device grippingly engages the bed to resist tensile forces generated in the securing means;

a clevis adapted to engage and retain the securing means to facilitate coupling of the securing means to the bed, said clevis being pivotally mounted to said second end of said body for movement about an axis substantially parallel to the top surface of said cargo bed, so that said clevis aligns with the direction of said tensile forces created in the securing means, whereby stress generated in said device by said tensile forces is reduced; and an engagement structure adjacent said clevis which extends outwardly from said second end of said body and which is adapted to matingly engage the top surface of the bed, whereby said engagement structure enables said device to be mounted and retained on the bed solely by its own configuration.

9. The tie-down device of claim 8 in which said hook comprises a first leg and a second leg forming an L-shaped configuration wherein said first leg is fixedly attached to said first end of said body at substantially a right angle thereto in said first direction, and wherein said second leg is fixedly attached to an end of said first leg opposite said end attached to said body, at substantially a right angle thereto, and in a direction which is generally toward said engagement structure, whereby said body, said first leg and said second leg collectively define a U-shaped configuration which is adapted to wrap around said bottom surface of the bed adjacent one of the sides of the bed.

10. A tie-down device for use in securing an object to a cargo bed of the type having a top mounting surface, opposite side surfaces, and bottom surfaces adjacent said sides, wherein said device couples to the bed a securing means which is adapted to engage and hold said object, and wherein said device is substantially channel-shaped and removably mounts to a side of the bed and is infinitely adjustable therealong, said device comprising:

a body which is adapted to extend along said side of the bed, and is provided with a first end and an opposite second end;

a hook which is fixedly attached to and extended outwardly from siad body in a first direction so that said hook is adapted to wrap around said bottom surface adjacent said side, whereby said device grippingly engages the bed to resist tensile forces generated in the securing means;

a coupling extending outwardly from said second end of said body and provided with an opening whereby the securing means is received and retained therein to facilitate coupling of the securing means to the bed, said coupling means comprising a pivotally mounted clevis, said clevis being adapted to engage the securing means and align itself with the direction of the tensile forces generated in the securing means, said clevis including two ends each of which is provided with an opening receiving a pivot pin therein;

a pair of spaced apart ears connected to said second end of said body, each said ear including a bore therethrough, said bores being aligned and shaped to matingly receive the pivot pin therein, to thereby pivotally mount said clevis to said body; and an engagement structure adjacent said coupling which extends outwardly from said second end of said body and which is adapted to matingly engage the top surface of the bed, whereby said engagement structure enables said device to be mounted and retained on the bed solely by its own configuration.

11. The tie-down device of claim 10 in which said engagement structure comprises a tang which is fixedly connected to said second end of said body between said ears, and wherein said tang extends from said body at substantially a right angle thereto.

12. The tie-down device of claim 11 which further comprises two spaced apart arms which fixedly connect said ears to said second end of said body, wherein said arms are inclined and extend outwardly at an acute angle to said tang.

13. The tie-down device of claim 12 wherein said hook, said body, said tang, said arms, and said ears are constructed of a single sheet of metal cut and bent into the appropriate configuration.

14. The tie-down device of claim 11 wherein said hook, said body, said tang, and said ears are constructed of a single sheet of metal cut and bent into the appropriate configuration.

15. The tie-down device of claim 10 which further comprises two spaced apart arms which fixedly connect said ears to said second end of said body, wherein said arms are inclined and extend outwardly at an acute angle to said engagement structure.

16. A tie-down device for use in securing an object to a cargo bed of the type having a top mounting surface, opposite side surfaces, and bottom surfaces adjacent said sides wherein said device couples to the bed a securing means which is adapted to engage and hold said object, and wherein said device is substantially channel-shaped and removably mounts to a side of the bed and is inifinitely adjustable therealong, siad device comprising:
- a body which is adapted to extend along said side of the bed, and is provided with a first end and an opposite second end;
- a hook which is fixedly attached to and extended outwardly from said body in a first direction so that said hook is adapted to wrap around said bottom surface adjacent said side, whereby said device grippingly engages the bed to resist tensile forces generated in the securing means;
- a plate member having a first end and a second end, said first end being fixedly connected to said second end of said body, said plate member extending outwardly from said body at an inclination in generally said first direction whereby said plate member is adapted to extend over the top surface of the bed at an acute angle thereto, and wherein said plate member is adapted to extend over the top surface of the bed at an acute angle thereto, and wherein said plate member further includes an opening adapted to receive and engage the securing means to thereby facilitate coupling of the securing means to the bed; and
- engagement means adjacent said plate member for engaging the top surface of the bed, whereby said engagement means enables said device to be mounted and retained on the bed solely by its own configuration.

17. The tie-down device of claim 16 in which said plate member is of a substantially rectangular shape and is provided, on its end opposite said attachment to said body, an arcuate extension member outward of said elongated opening, whereby said opening is provided with greater strength to thereby resist the tensile forces.

18. The tie-down device of claim 16 in which said engagement structure comprises a pair of spaced apart legs which extend in the first direction relative to said body and extend toward said hook relative to said plate member, and wherein said legs are each provided with a first end and a second end in which said first end is fixedly mounted to said plate member and said second end is adapted to engage the top surface of the bed.

19. The tie-down device of claim 18 wherein said hook, said body, said plate member, and said legs are all constructed of a single sheet of sheet metal cut and bent into the appropriate configuration.

20. The tie-down device of claim 18 further comprising an extension member which fixedly connects said plate member to said second end of said body, wherein said extension member extends outwardly from said body at a substantially right angle thereto, and is adapted to matingly engage with the top surface of the bed.

21. The tie-down device of claim 20 wherein said hook, said body, said extension member, said plate member, and said legs are all constructed of a single piece of sheet metal cut and bent into an appropriate configuration.

22. A tie-down device for use in securing an object to a cargo bed of the type having a top mounting surface and a pair of opposite side surfaces, said device comprising:
- a body removably mounted to one of said side surfaces and being infinitely adjustable along the length thereof;
- a coupling means having an opening for receiving and retaining securing means so that said securing means extends over the object in a tight-fitting manner, said coupling means being positioned to overlie the top surface of said bed;
- a hook means attached to said body for wrapping around a lower edge of the bed, whereby said device grippingly engages the bed to resist tensile forces generated in the securing means; and
- an extension member connecting said coupling means to said body, said extension member being positioned to project inwardly from said body to overlie and matingly engage the top surface of the bed, whereby a cover can be mounted to said bed at locations outside the coupling means but inwardly of the side surfaces of the bed.

23. The tie-down device of claim 22 in which said body further includes a first end and an opposite second end, and in which said hook means is attached to said first end of said body and said extension member is attached to said second end of said body.

* * * * *

UNITED STATES PATENT AND TRADEMARK OFFICE
CERTIFICATE OF CORRECTION

PATENT NO. : 4,818,162

DATED : April 4, 1989

PAGE 1 OF 5

INVENTOR(S) : Raymond C. Zukowski and Terrance M. Zukowski

It is certified that error appears in the above-identified patent and that said Letters Patent is hereby corrected as shown below:

Column 1, line 26:

capacility" should be --capability--.

Column 1, line 37:

"be" should be --the--.

Column 1, line 56:

"use" should be --user--.

Column 2, line 3:

"attached" should be --attaches--.

Column 2, line 34:

"thoudsands" should be --thousands--.

Column 2, line 39:

"deivces" should be --devices--.

Column 2, line 52:

"acrosss" should be --across--.

Column 2, line 53:

"an" should be --and--.

UNITED STATES PATENT AND TRADEMARK OFFICE
CERTIFICATE OF CORRECTION

PATENT NO. : 4,818,162
DATED : April 4, 1989
INVENTOR(S) : Raymond C. Zukowski and Terrance M. Zukowski It is certified that error appears in the above-identified patent and that said Letters Patent is hereby corrected as shown below:

Column 3, line 23:

"deivce" should be --device--.

Column 3, line 36:

"specifications" should be --specification--.

Column 3, line 49:

"embodiments" should be --embodiment--.

Column 3, line 60:

After "of" insert --a--.

Column 5, line 60:

After "Arms" insert --43--.

Column 6, line 23:

"structing" should be --structuring--.

Column 7, line 12:

"with" should be --will--.

Column 7, line 22:

After "object" insert --10--.

UNITED STATES PATENT AND TRADEMARK OFFICE
CERTIFICATE OF CORRECTION

PATENT NO. : 4,818,162
DATED : April 4, 1989
INVENTOR(S) : Raymond C. Zukowski and Terrance M. Zukowski It is certified that error appears in the above-identified patent and that said Letters Patent is hereby corrected as shown below:

Column 7, line 33:

"distributes" should be --distribute--.

Column 7, claim 1, line 50:

"oppostie" should be --opposite--.

Column 8, claim 1, line 1:

"fro" should be --for--.

Column 8, claim 1, line 7:

"menas" should be --means--.

Column 8, claim 3, lines 37-41:

Delete "and wherein said plate member further includes a centrally located elongated opening adapted to receive and engage the securing means to thereby facilitate coupling of the securing means to the bed" and insert therefor --said coupling means being pivotally secured to said second end of said plate member--.

UNITED STATES PATENT AND TRADEMARK OFFICE
CERTIFICATE OF CORRECTION

PATENT NO. : 4,818,162

DATED : April 4, 1989

INVENTOR(S) : Raymond C. Zukowski and Terrance M. Zukowski

PAGE 4 OF 5

It is certified that error appears in the above-identified patent and that said Letters Patent is hereby corrected as shown below:

Column 9, claim 6, line 21:

Delete "body" and insert therefor --plate member--.

Column 9, claim 6, lines 21 and 22:

Delete "extend toward" and insert therefor --wherein--.

Column 10, claim 10, line 27:

"siad" should be --said--.

Column 10, claim 10, line 32:

After "coupling" insert --means--.

Column 10, claim 10, line 50:

After "coupling" insert --means--.

Column 11, claim 16, line 19:

"inifinitely" should be --infinitely--.

Column 11, claim 16, line 19:

"siad" should be --said--.

UNITED STATES PATENT AND TRADEMARK OFFICE
CERTIFICATE OF CORRECTION

PATENT NO. : 4,818,162
DATED : April 4, 1989
INVENTOR(S) : Raymond C. Zukowski and Terrance M. Zukowski It is certified that error appears in the above-identified patent and that said Letters Patent is hereby corrected as shown below:

Column 11, claim 16, lines 36-38:

Delete "and wherein said plate member is adapted to extend over the top surface of the bed at an acute angle thereto,".

Signed and Sealed this

Twenty-seventh Day of February, 1990

*Attest:*

JEFFREY M. SAMUELS

*Attesting Officer*      *Acting Commissioner of Patents and Trademarks*